(12) United States Patent
Banerjee

(10) Patent No.: US 8,832,848 B1
(45) Date of Patent: Sep. 9, 2014

(54) SYSTEMS AND METHODS FOR CONTENT-AWARE ACCESS CONTROL

(75) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/559,196

(22) Filed: Jul. 26, 2012

(51) Int. Cl.
*H04L 29/06* (2006.01)

(52) U.S. Cl.
USPC .......................................................... 726/26

(58) Field of Classification Search
USPC ........................ 726/26, 27, 28, 30
See application file for complete search history.

(56) References Cited

U.S. PATENT DOCUMENTS

2011/0126281 A1* 5/2011 Ben-Zvi et al. ................ 726/21
2011/0321175 A1* 12/2011 Slater ............................ 726/28

* cited by examiner

*Primary Examiner* — Edward Zee
(74) *Attorney, Agent, or Firm* — Holland & Hart LLP

(57) ABSTRACT

A computer-implemented method for content-aware access control is described. An access control action is obtained. The access control action identifying content and one or more users. A sensitivity classification is determined for the content. A sensitivity rating is determined for the one or more users. A determination is made as to whether the sensitivity classification and the sensitivity rating satisfy a policy. Upon determining that the policy is not satisfied, a policy restriction is enforced.

16 Claims, 11 Drawing Sheets

SYSTEMS AND METHODS FOR CONTENT-AWARE ACCESS CONTROL

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

The wide-spread use of computers and the prevalence of Internet connectivity have made sharing data increasingly easy. For example, cloud based content distribution systems allow data to be instantly shared across the globe to users on different networks. Unfortunately, the easy sharing of data presents security concerns.

SUMMARY

A computer-implemented method for content-aware access control is described. An access control action is obtained. The access control action identifying content and a user. A sensitivity classification is determined for the content. A sensitivity rating is determined for the user. A determination is made as to whether the sensitivity classification and the sensitivity rating satisfy a policy. Upon determining that the policy is not satisfied, a policy restriction is enforced.

In some configurations, the sensitivity classification may be matched with the given sensitivity classification. In some configurations, the sensitivity rating may be compared with the required sensitivity rating.

In one embodiment, access control traffic and data traffic that is being communicated to a content sharing service may be intercepted. In some cases, the content sharing service is a software as a service cloud provider. The access control traffic may be inspected to obtain the access control action. The data traffic may be inspected to generate a database of sensitivity classifications. In some configurations, the sensitivity classification may be determined from the database of sensitivity classifications.

In some cases, the policy restriction comprises rejecting the access control action. In one example, the content comprises at least one of a file and a folder. In some configurations, the policy specifies a required sensitivity rating for a given sensitivity classification.

A computing device configured for content-aware access control is also described. The computing device includes a processor, memory in electronic communication with the processor, and instructions stored in the memory. The instructions being executable by the processor to obtain an access control action. The access control action identifying content and a user. The instructions also being executable by the processor to determine a sensitivity classification for the content. The instructions additionally being executable by the processor to determine a sensitivity rating for the user. The instructions also being executable by the processor to determine whether the sensitivity classification and the sensitivity rating satisfy a policy. Upon determining that the policy is not satisfied, the instructions further being executable by the processor to enforce a policy restriction.

A computer-program product for content-aware access control is additionally described. The computer-program product includes a non-transitory computer-readable storage medium that stores computer executable instructions. The instructions being executable by the processor to obtain an access control action. The access control action identifying content and a user. The instructions also being executable by the processor to determine a sensitivity classification for the content. The instructions additionally being executable by the processor to determine a sensitivity rating for the user. The instructions also being executable by the processor to determine whether the sensitivity classification and the sensitivity rating satisfy a policy. Upon determining that the policy is not satisfied, the instructions further being executable by the processor to enforce a policy restriction.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
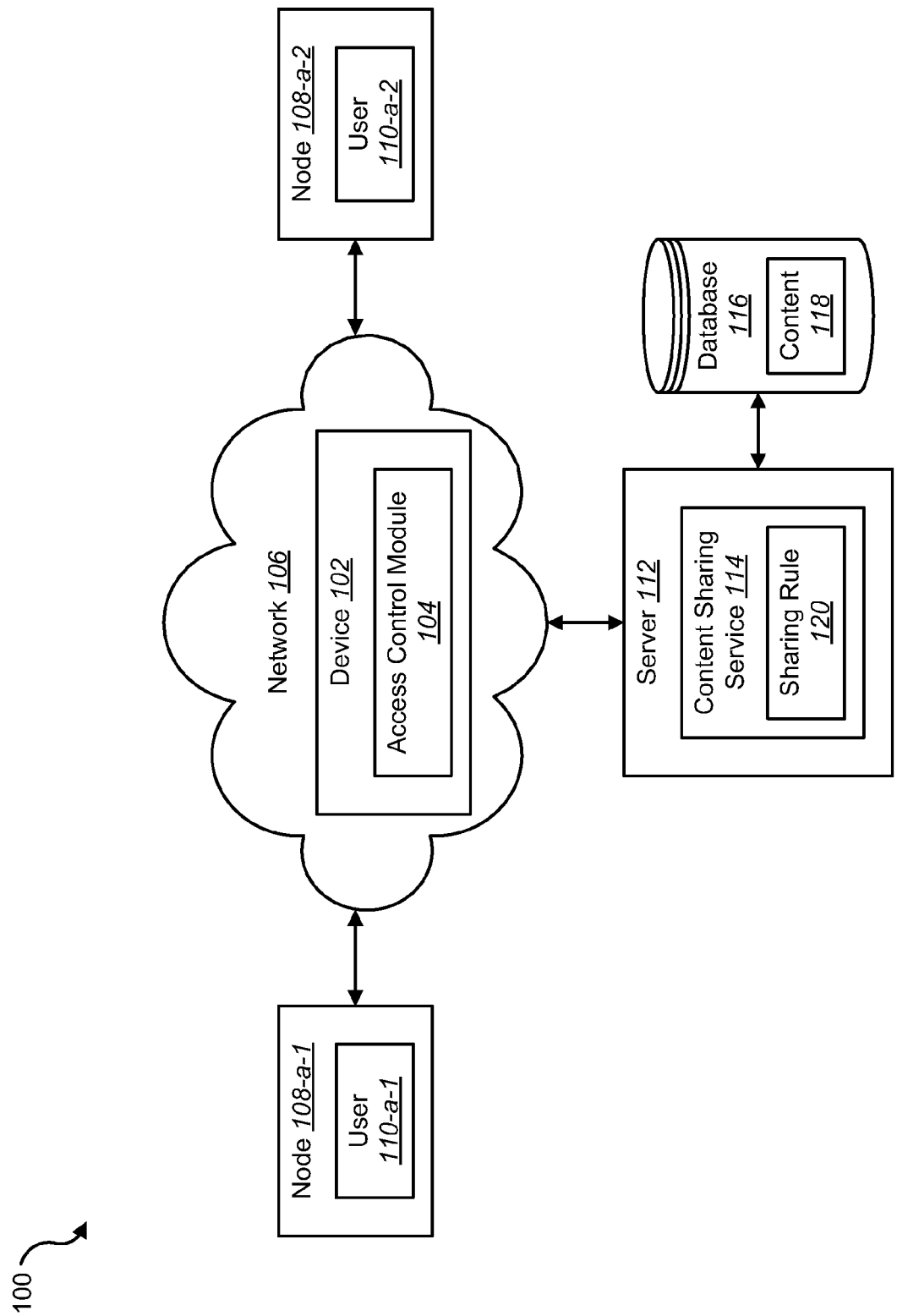
FIG. 1 is a block diagram illustrating one example of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In various situations, content can easily be shared between users inside and outside of controlled environments (e.g., enterprises). For example, content may easily be shared between users via software as a service (SaaS) clouds such as Box.net. For instance, content may be shared as easy as right clicking a document folder, and inviting a user by their email address (the user could be in any enterprise, for example). In some cases, the ease in which content may be shared inside and outside of controlled environments may result in security risks. To address these concerns about security, these SaaS clouds may allow administrators finer grain control as to which folders/files can be shared, who they can be shared with, and how long they can be shared. However, current solutions do not have any awareness about the sensitivity of the document/folder. The systems and methods described herein may enable content-aware policy-based access control. For example, the systems and methods described herein may control access based on the sensitivity of the content, the sensitivity rating of the user, and the user's roles. In some configurations, the systems and methods described herein may use network brokers (pass through devices that monitor and/or control network traffic, for example).

In some configurations, a policy-based data content aware access control mechanism (e.g., access control module) is described. In some cases, the policy-based content aware access control mechanism is layered on top of the SaaS provider access controls. For example, some or all of the network traffic that goes into the SaaS cloud provider may pass through the policy-based content aware access control mechanism. In some configurations, some or all access control traffic and/or some or all of the data traffic coming into the content sharing SaaS cloud provider may be inspected. In some configurations, the data traffic is inspected to determine content sensitivity information for the data. The content sensitivity information may be used to generate a data classification metadata database which tracks sensitivity of cloud content. In some configurations, policy definitions may allow administrators to define which content classifications can be shared and with whom. In some cases, the policy-based content aware access control mechanism may be a policy enforcement point. In one example, authentication and data brokers may be used to apply policies to all access control actions initiated by content owners. If the policy engine detects a policy violation, then the access control action on the content at the SaaS cloud provider may be rejected/alerted/work-flowed to a manager. In some cases, all of these can be achieved using data and authentication brokers that inspect all authentication and data traffic into the SaaS provider. Additionally, the policy definition engine is aware of the data sensitivity classification and user sensitivities. In some configurations, this can be achieved using authentication and data brokers (as proposed in Symantec 03 'Ozone', for example). In some cases, the systems and methods described herein may enforce consistent content sharing policies across multiple SaaS clouds (e.g., Box, Dropbox, Office365, Google Docs, etc.). In one example, this may facilitate regulatory compliance for geographical content based restrictions.

Referring now to the figures, FIG. 1 is a block diagram illustrating one example of an environment 100 in which the present systems and methods may be implemented. In one example, content 118 (e.g., folder, files, portions of files, etc.) may be owned by a first user 110-*a*-1. In this example, the first user 110-*a*-1 may have uploaded the content 118 to a content sharing service 114 to be hosted by the content sharing service 114. Examples of content sharing services 114 include SaaS cloud providers (e.g., Box, Dropbox, Office365, Google Docs, etc.) and file management systems. In one example, the content sharing service 114 may store the content 118 in a database 116. In one example, the content sharing service 114 may be hosted by a server 112.

In some configurations, the content sharing service 114 may use access control actions (e.g., sharing rules 120) to allow other users to access the content 118. For example, the first user 110-*a*-1 may allow another user to access the content by creating a sharing rule 120 that identifies the content 118, the identity of the user to receive access, and the parameters of the access. In one example, the first user 110-*a*-1 may interface with the content sharing service 114 via communications through the network 106. For example, the first user 110-*a*-1 may communicate with the server 112 through the network 106 by interfacing with a first node 108-*a*-1. The nodes 108 may be a computing device such as, but not limited to, a personal computer, a laptop, a tablet, a personal digital assistant (PDA), a mobile communications device, etc.

In one embodiment, a device 102 may intercept the communications (e.g., traffic) that are being communicated to the content sharing service 114. For instance, some or all of the communications to the server 112 may pass through the device 102 before being communicated to the server 112. In one example (as shown), the device 102 may be located in the network 106. Examples of devices 102 include computers, servers (e.g., server 112), network appliances, computing devices, etc. Examples of networks 106 include local area networks (LAN), wide area networks (WAN), personal area networks (PAN), the Internet, etc. In some cases, the network 106 includes one or more Internet Protocol (IP) networks, cellular networks, satellite networks, fiber optic networks, etc.

In one example, the first user 110-*a*-1 may want to allow a second user 110-*a*-2 at a second node 108-*a*-2 to access the content 118. In one embodiment, the first user 110-*a*-1 may attempt to create a sharing rule 120 that allows the second user 110-*a*-2 to access the content 118. For instance, the first user 110-*a*-1 may identify the content 118 to be shared and that the second user 110-*a*-2 is the user that the content 118 is to be shared with. In one example, the first user 110-*a*-1 may identify the second user 110-*a*-2 by using an email address that is owned by the second user 110-*a*-2. In one embodiment, the instructions to create this sharing rule (sharing rule 120, for example) may be intercepted by an access control module 104 on the device 102.

In one embodiment, the access control module 104 may validate that the sensitivity classification of the content 118 and the sensitivity rating of the second user 110-*a*-2 satisfies one or more predetermined policies before passing the instructions to the content sharing service 114. For example, the access control module 104 may allow the instructions to create the sharing rule to be communicated to the content sharing service 114 when the sharing rule is valid (e.g., satisfies each policy). In another example, the access control module 104 may deny the instructions to create the sharing rule from being communicated to the content sharing service 114 and reject the request to create the sharing rule when the sharing rule is invalid (e.g., does not satisfy each policy). Therefore, in some cases, the access control module 104 may enforce compliance with access control policies. The access control module 104 is discussed in greater detail below.

Figure 2:
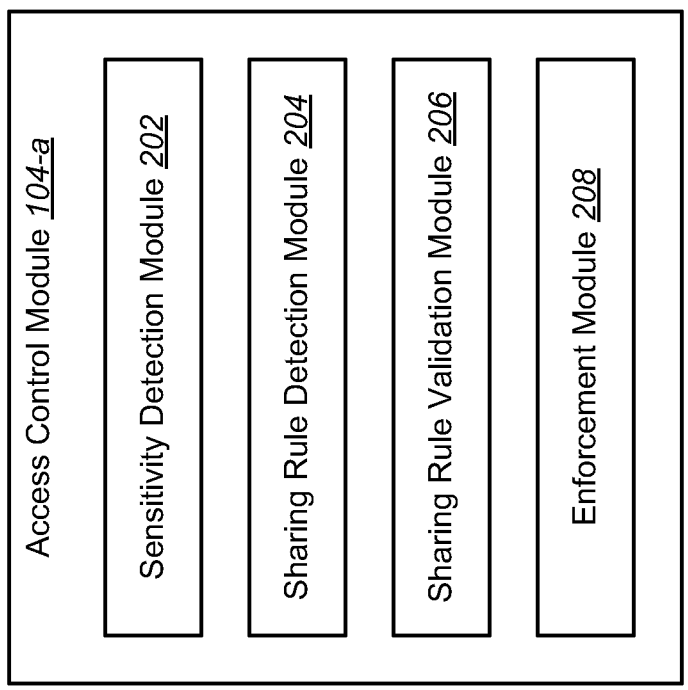
FIG. 2 is a block diagram illustrating one example of an access control module.

FIG. 2 is a block diagram illustrating one example of an access control module 104-*a*. The access control module 104-*a* may be one example of the access control module 104 illustrated in FIG. 1. In some configurations, the access control module 104-*a* includes a sensitivity detection module 202, a sharing rule detection module 204, a sharing rule validation module 206, and an enforcement module 208.

In one embodiment, the sensitivity detection module 202 may detect sensitivity classifications for content and/or sensitivity ratings for users. For example, the sensitivity detection module 202 may detect information about the type of content that data includes. For instance, the sensitivity detection module 202 may inspect data traffic that is being communicated into the content sharing service 114 to determine data classification information for the content. In another example, the sensitivity detection module 202 may detect information about the type of content that a user may receive. For example, the sensitivity detection module 202 may determine the user is a member of certain security groups or that the user has permission to view certain types of data or geographically resident-constrained data. The sensitivity detection module 202 is discussed in greater detail below.

In one embodiment, the sharing rule detection module 204 may inspect the access control traffic that is being communicated into the content sharing service 114 to detect/obtain access control actions. For example, the sharing rule detection module 204 may monitor the access control traffic for any attempts to change access control privileges for other users. For instance, the sharing rule detection module 204 may detect attempts to create sharing rules 120.

In one embodiment, the sharing rule validation module 206 may validate that an attempted access change is in accordance with one or more predefined policies. In one example, the predefined policies may be established by administrators and/or owners of the content. In some configurations, the sharing rule validation module 206 may determine that a sharing rule 120 is valid when the sharing rule 120 satisfies each of the one or more predefined policies and may determine that the sharing rule 120 is invalid when the sharing rule does not satisfy one or more of the predefined policies. The sharing rule validation module 206 is discussed in greater detail below.

In one embodiment, the enforcement module 208 may enforce any applicable policy restrictions corresponding to the one or more predefined policies. In one example, when a policy is determined to not be satisfied (e.g., the sharing rule 120 is determined to be invalid), the policy restrictions may require that the request be denied, a manager be alerted of the access request, and/or that an administrator approve/disapprove of the request. For instance, the enforcement module 208 may prohibit the sharing rule 120 from being created and reject the request to create the sharing rule 120. Additionally or alternatively, the enforcement module 208 may alert an administrator of the policy violation. Additionally or alternatively, the enforcement module 208 may require an administrator to approve of the sharing rule 120 before it is passed on to and/or created at the content sharing service 114. In another example, if a policy is determined to be satisfied, then the enforcement module 208 may allow the sharing rule 120 to be created. In some configurations, the enforcement module 208 may require that a sharing rule 120 include additional access requirements and/or security protections. For instance, the policy restrictions may require that the access be limited to a certain time period and/or to predetermined geographic locations. In some cases, the enforcement module 208 may modify the sharing rule 120 to satisfy one or more policies.

Figure 3:
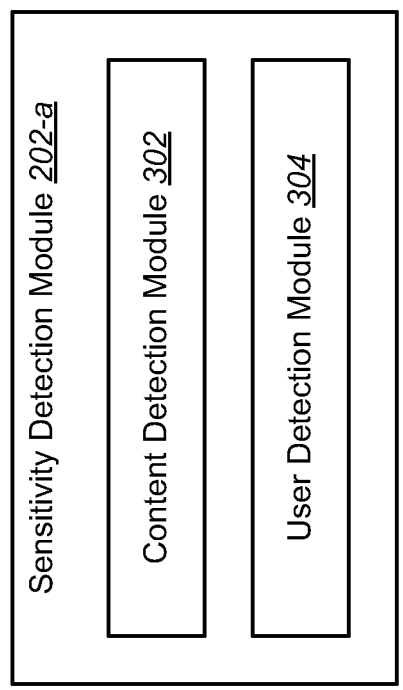
FIG. 3 is a block diagram illustrating one example of a sensitivity detection module.

FIG. 3 is a block diagram illustrating one example of a sensitivity detection module 202-a. The sensitivity detection module 202-a may be one example of the sensitivity module 202 illustrated in FIG. 2. In some configurations, the sensitivity detection module 202-a may include a content detection module 302 and a user detection module 304. In some configurations, the content detection module 302 may detect one or more sensitivity classifications for the content 118. For example, the content detection module 302 may detect different sensitivity classifications for different portions of the content 118. In some configurations, the user detection module 304 may detect one or more security ratings for a user. For example, the user detection module 304 may determine the security groups, trust circles, etc, to which the user is a member. The content detection module 302 and the user detection module 304 are discussed in greater detail below.

Figure 4:
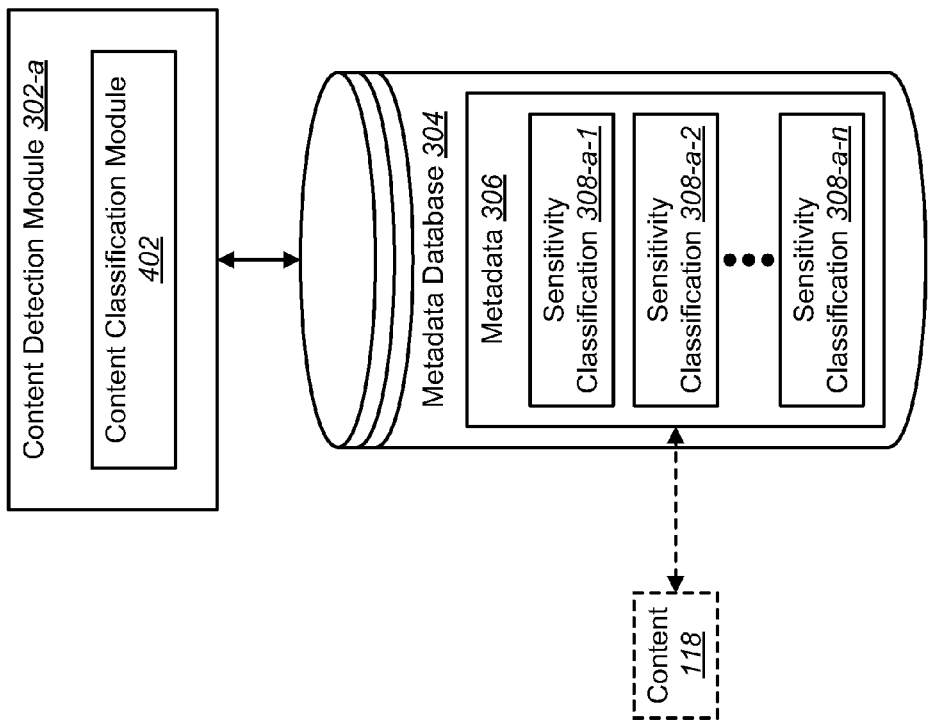
FIG. 4 is a block diagram illustrating one example of a content detection module.

FIG. 4 is a block diagram illustrating one example of a content detection module 302-a. The content detection module 302-a may be one example of the content detection module 302 illustrated in FIG. 3. In some configurations, the content detection module 302-a may include a content classification module 402.

In one embodiment, the content classification module 402 may inspect some or all of the traffic data that is being communicated into the content sharing service 114 to determine one or more sensitivity classifications 308 for each piece of content 118. For example, the content classification module 402 may analyze the content 118 to determine the sensitivity classifications 308 that should be applied. For example, if the content 118 includes Payment Card Industry (PCI) data, then a first sensitivity classification 308-a-1 may indicate that the content includes PCI data. If the content 118 includes executive level information, then a second sensitivity classification 308-a-2 may indicate that the content 118 includes executive level information. If the content includes personal data and the origin of the content is from Germany, then an nth sensitivity classification 308-a-n may indicate that the content 118 includes protect personal data (PII data such as that described by EU DP legislation). In another example, sensitivity classifications 308 may be manually assigned to the content 118 (by an administrator, for example). It may be noted that any of a variety of known or new methodologies may be used for sensitive content detection and sensitivity classification.

In some configurations, the sensitivity classifications 308 may be stored as metadata for the content 118. For example, metadata 306 that includes the content classifications 308 may be created for each content 118. In some configurations, the metadata 306 may be stored in a metadata database 304.

Figure 5:
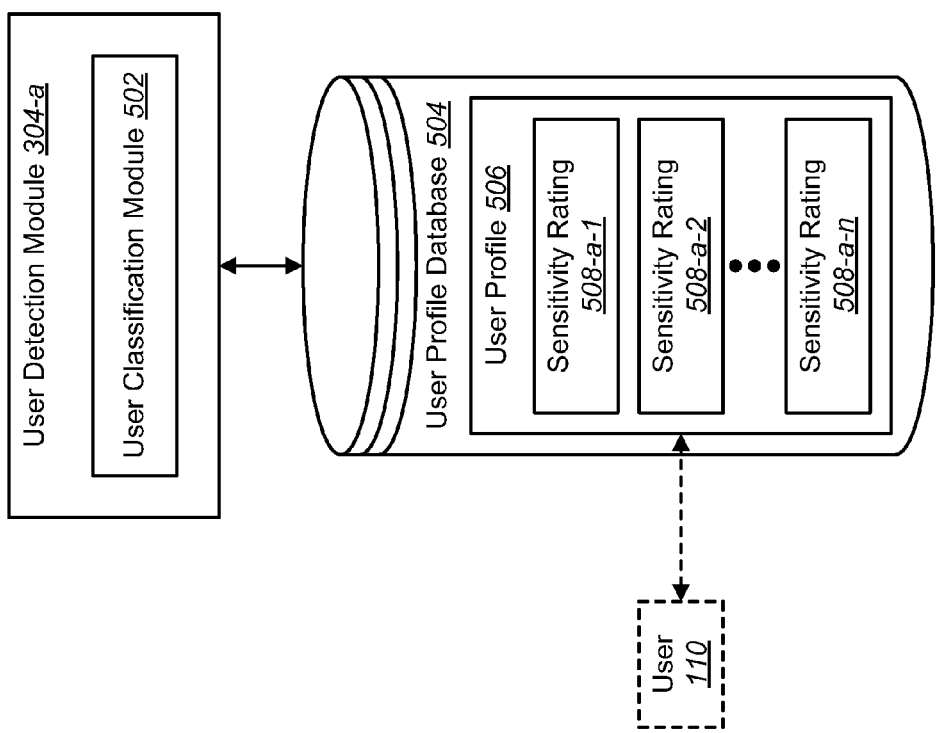
FIG. 5 is a block diagram illustrating one example of a user detection module.

FIG. 5 is a block diagram illustrating one example of a user detection module 304-a. The user detection module 304-a may be one example of the user detection module 304 illustrated in FIG. 3. In some configurations, the user detection module 304-a may include a user classification module 502.

In one embodiment, the user classification module 502 may inspect some or all of the access control traffic that is being communicated into the content sharing service 114 to identify a user (a user that is to be allowed access, for example). A user may be identified by an email address. In some configurations, the user classification module 502 may search for additional information about the identified user (e.g., user 110). For example, the user classification module 502 may determine if the identified user is a member of any groups or networks based on, for example, membership in enterprise directories. For instance, the user classification module 502 may analyze the domain name of the email address to determine if the user is a part of the same domain. In another example, a Lightweight Directory Access Protocol (LDAP) system (e.g., Active Directory) may be queried to determine if the identified user is a member of any groups (groups that would indicate elevated security privileges, for example). In another example, the geographic location of the user may be determined.

In some configurations, a user profile 506 may be created for each user 110. In some cases, the user profile 506 may include one or more sensitivity ratings 508 for the user 110. For example, if the user 110 is a member of a domain, then a first sensitivity rating 508-a-1 may indicate that the user is a member of the domain. If the user 110 is a member of a security group (e.g., executives group), then a second sensitivity rating 508-a-2 may indicate that the user is a member of the security group. If the user 110 is not in a particular geographical location, then an nth sensitivity rating 508-a-n may indicate that the user is not a member of a particular geographical group.

Figure 6:
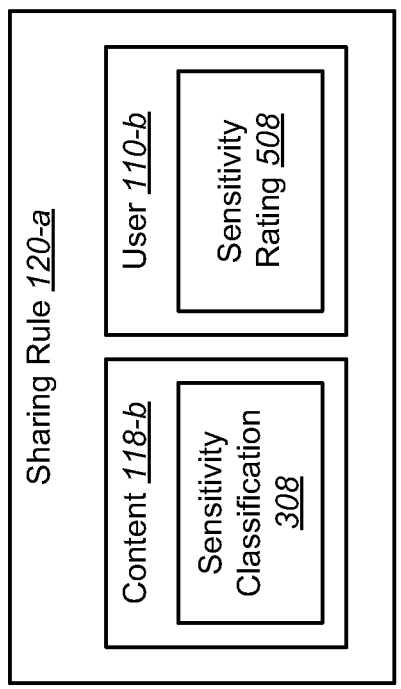
FIG. 6 is a block diagram illustrating one example of a sharing rule.

FIG. 6 is a block diagram illustrating one example of a sharing rule 120-a. The sharing rule 120-a may be one example of the sharing rule 120 illustrated in FIG. 1. In some configurations, the sharing rule 120-*a* may identify content 118-*b* and one or more users 110-*b* that are allowed to access the content 118-*b*. In some configurations, the sharing rule detection module 204 may associate one or more sensitivity classifications 308 with the content 118-*b* and/or may associate one or more sensitivity ratings 508 with the user 110 (as shown). For example, the sharing rule detection module 204 may associate the sensitivity classifications 308 and/or the sensitivity ratings 508 with the sharing rule 120-*a* so that sharing rule 120-*a* may be evaluated against one or more content-aware policies.

Figure 7:
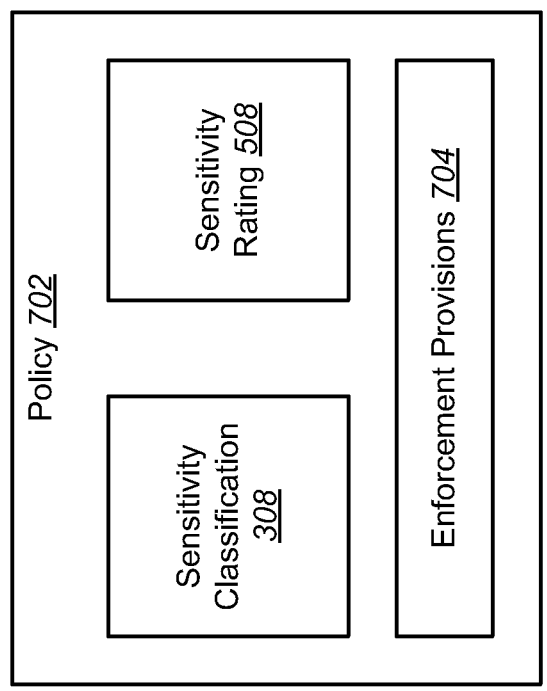
FIG. 7 is a block diagram illustrating one example, of a policy.

FIG. 7 is a block diagram illustrating one example, of a policy 702. In some configurations, the policy 702 may be a content-aware policy. For example, the policy 702 may require that a user 110 have one or more specified sensitivity ratings 508 in order to access data with one or more given sensitivity classifications 308. For example, if the content 118 includes a sensitivity classification 308 for PCI DSS data, sensitive data and company information, then a user 110 may be required to have sensitivity ratings 508 for employees of the company and be in the group of direct reports to the chief financial officer (CFO) to access the content 118. In another example, if the content 118 includes sensitivity classifications 308 for personal data and originated in Germany, then a sensitivity rating 508 may require that access be limited to geographical areas within Germany (to comply with data privacy regulations, for example). In yet another example, if the content 118 includes sensitivity classifications 308 for executive level information, then a user 110 may be required to have a sensitivity rating 508 for executive level information (for that company).

In some configurations, the policy 702 may additionally include enforcement provisions 704. For example, the enforcement provisions 704 may indicate the policy restriction for when the policy 702 is not satisfied (reject, alert, and/or request permission, for example). In another example, the enforcement provisions 704 may indicate policy restrictions (additional access restrictions, for example) for accessing content under that policy (limiting write access to specific terminals (e.g., nodes 108), for example).

Figure 8:
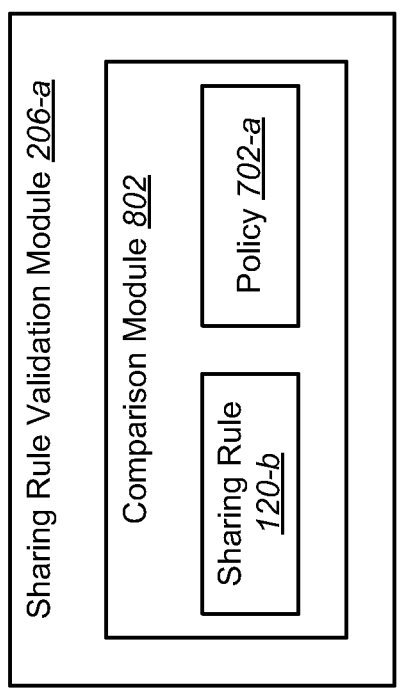
FIG. 8 is a block diagram illustrating one example of a sharing rule validation module.

FIG. 8 is a block diagram illustrating one example of a sharing rule validation module 206-*a*. The sharing rule validation module 206-*a* may be one example of the sharing rule validation module 206 illustrated in FIG. 2. In some configurations, the sharing rule validation module 206-*a* may include a comparison module 802.

In one embodiment, the comparison module 802 may compare a sharing rule 120-*b* against one or more policies 702-*a*. Sharing rule 120-*b* may be one example of the sharing rules 120 illustrated in FIG. 1 or 6. Policy 702-*a* may be one example of the policy 702 illustrated in FIG. 7. For example, the comparison module 802 may determine if the sensitivity classifications 308 and sensitivity ratings 508 for the sharing rule 120-*b* satisfy the sensitivity classification 308 and sensitivity rating 508 requirements of the policies 702-*a*. In one example, the comparison module 802 may match the sensitivity classifications 308 of the sharing rule 120-*b* with the given sensitivity classifications 308 of the policies 702-*a* to determine which policies are applicable to that sharing rule 120-*b*. In this example, the comparison module 802 may then compare the sensitivity ratings of the sharing rule 120-*b* with the required sensitivity ratings 120-*b* of the policy 702-*a* to determine if the sharing rule 120-*b* satisfies the policies 702-*a*. In some cases, the comparison module 802 may also compare any enforcement provisions of the policy 702-*a* with enforcement provisions of sharing rule 120-*b*.

In some configurations, the sharing rule validation module 206-*a* may determine if a sharing rule 120-*b* is valid. In some cases, the sharing rule validation module 206 may determine that a sharing rule 120-*b* is valid when each policy 702-*a* is satisfied. In some cases, the sharing rule validation module 206-*a* may determine that a sharing rule 120-*b* is invalid when one or more policies 702-*a* are not satisfied (or not approved by an administrator, for example).

Figure 9:
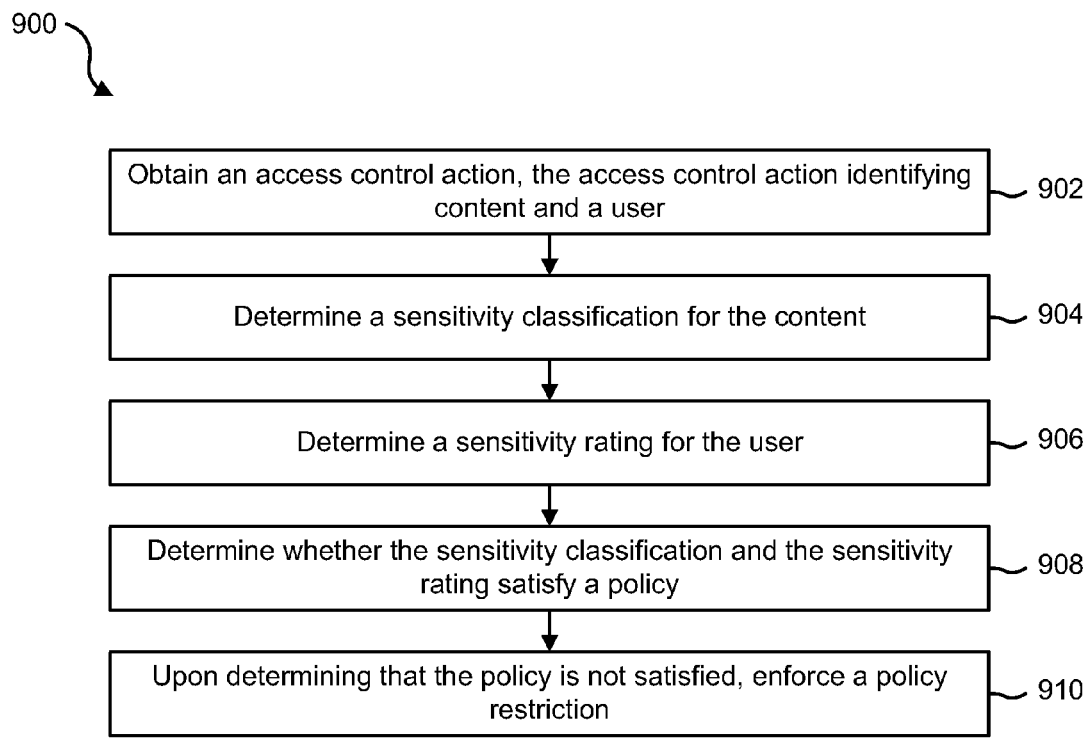
FIG. 9 is a flow diagram illustrating one example of a method for content-aware access control.

FIG. 9 is a flow diagram illustrating one example of a method 900 for content-aware access control. In some configurations, the method 900 may be performed by the access control module 104.

At step 902, an access control action may be obtained. The access control action identifying content and a user. For example, the access control action may be a sharing rule as described previously. At step 904, a sensitivity classification may be determined for the content. For example, the sensitivity classification may be determined as described previously or by using one of the many available sensitivity classification systems. At step 906, a sensitivity rating may be determined for the user. For example, the sensitivity rating may be determined as described previously. At step 908, a determination may be made as to whether the sensitivity classification and the sensitivity rating satisfy a policy. For example, the determination may be made based on a comparison of the sensitivity classification and the sensitivity rating and the policy requirements as described previously. Upon determining that the policy is not satisfied, at step 910, a policy restriction may be enforced.

Figure 10:
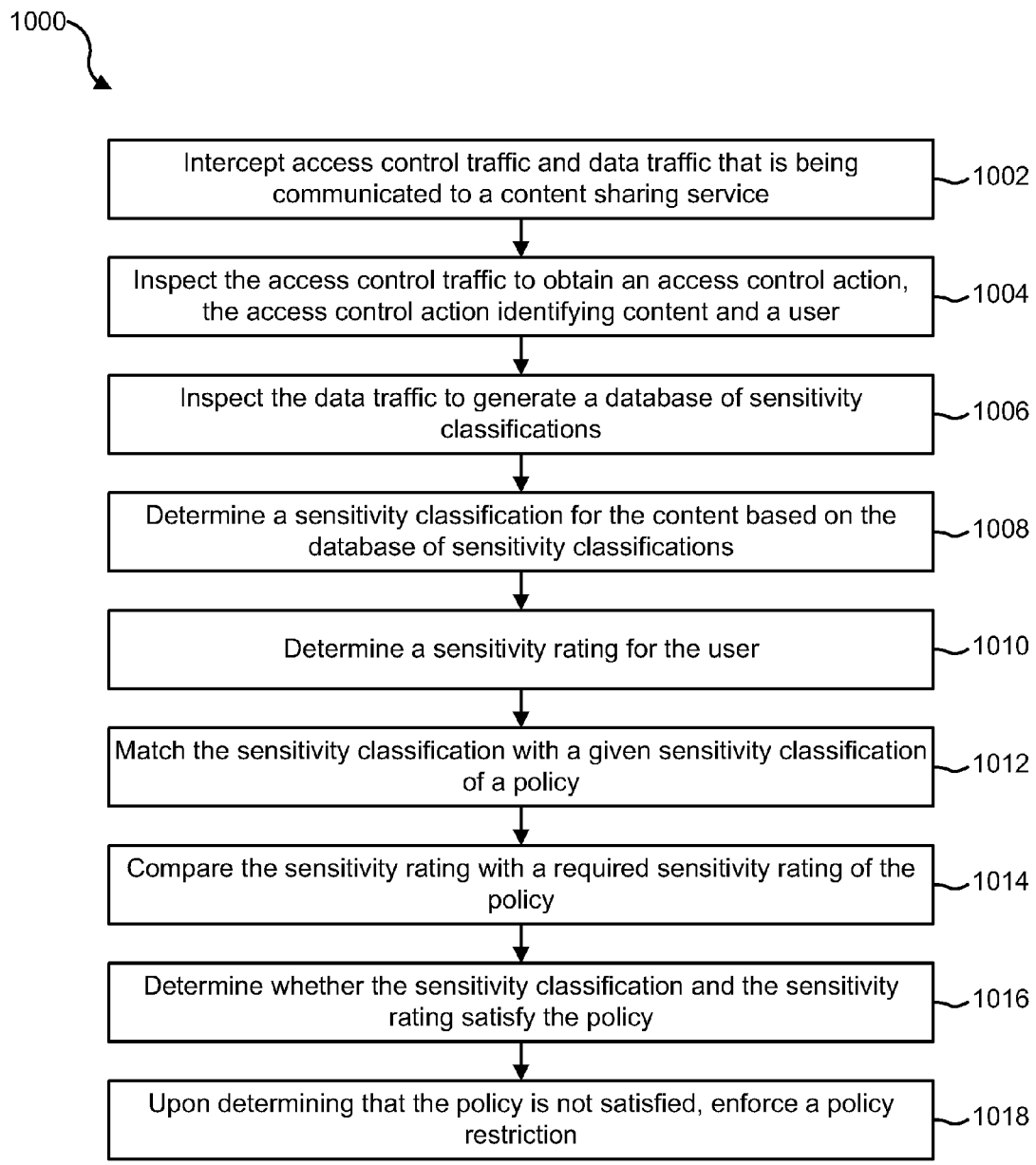
FIG. 10 is a flow diagram illustrating another example of a method for content-aware access control.

FIG. 10 is a flow diagram illustrating another example of a method 1000 for content-aware access control. In some configurations, the method 1000 may be performed by the access control module 104.

At step 1002, access control traffic and data traffic that is being communicated to a content sharing service may be intercepted. For example, some or all of the communications to the content sharing service may pass through access control module 104. In one embodiment, the step 1002 of intercepting data traffic and access control traffic may be performed continuously as the traffic is uploaded to a cloud system and communicated to the content sharing service. As a result, the step 1002 may be performed continuously and in parallel as the remaining steps described below are performed.

At step 1004, the access control traffic may be inspected to obtain an access control action. The access control action identifying content and a user. At step 1006, the data traffic may be inspected to generate a database of sensitivity classifications. For example, the metadata for each content may be generated based on the inspection of the data traffic. At step 1008, a sensitivity classification for the content may be determined based on the database of sensitivity classifications. For example, the access control module 104 may identify the content and obtain the metadata for the indentified content.

At step 1010, a sensitivity rating may be obtained for the user. At step 1012, the sensitivity classification may be matched with a given sensitivity classification of a policy. For example, in some configurations, the applicable policies may be determined based on the sensitivity classification of the content. For instance, if the content is not associated with any sensitivity classifications then the content-aware policies may not be applicable. At step 1014, the sensitivity rating may be compared with a required sensitivity rating of the policy. At step 1016, a determination may be made as to whether the sensitivity classification and the sensitivity rating satisfy the policy. For example, the determination may be based on whether the sensitivity rating satisfies the required sensitivity rating of the policy. Upon determining that the policy is not satisfied, at step 1018, a policy restriction may be enforced. For example, the access control action may be rejected (e.g., not passed through to the content sharing service and a rejection sent to the user).

Figure 11:
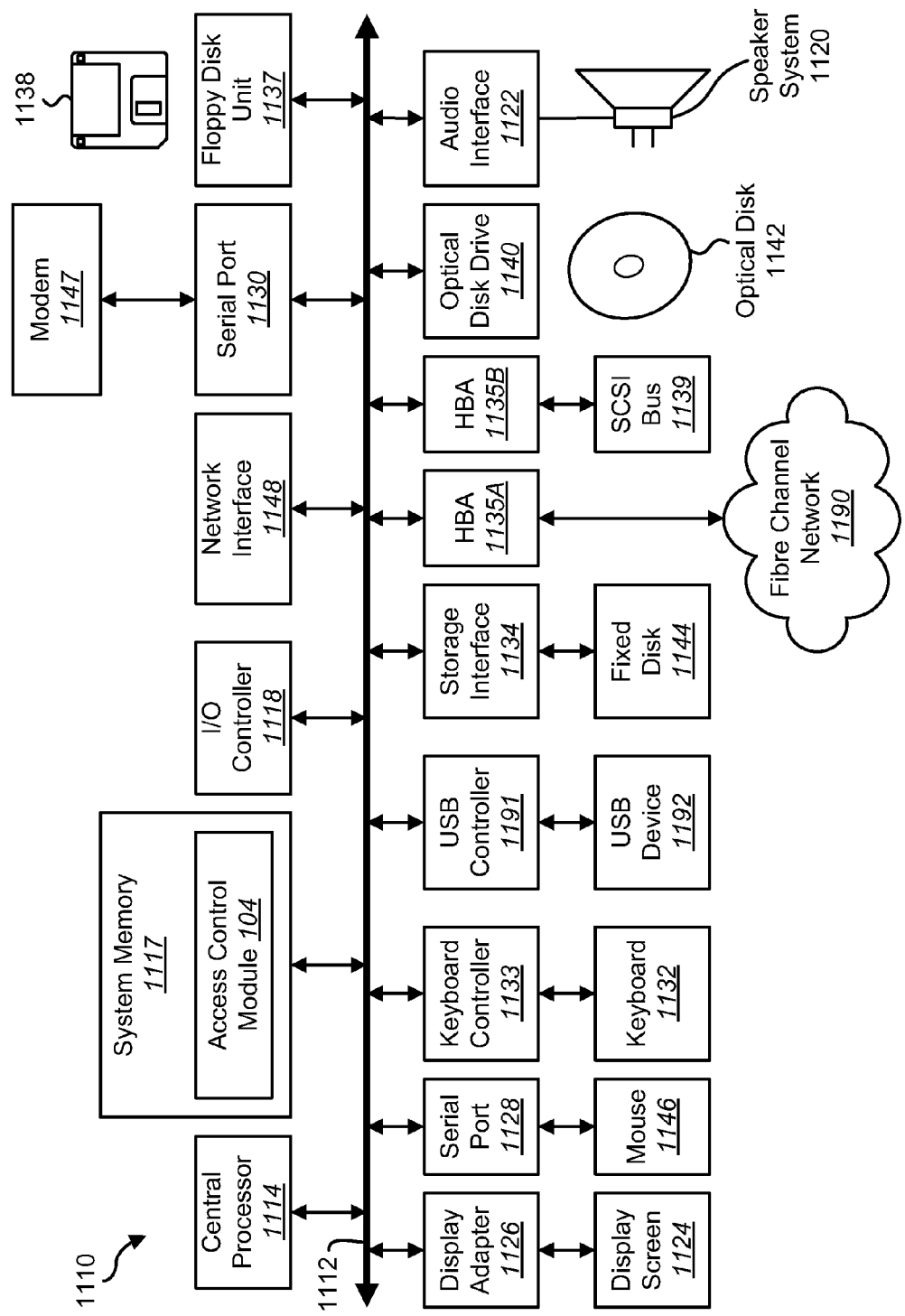
FIG. 11 depicts a block diagram of a computer system suitable for implementing the present systems and methods.

FIG. 11 depicts a block diagram of a computer system 1110 suitable for implementing the present systems and methods. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), multiple USB devices 1192 (interfaced with a USB controller 1191), a storage interface 1134, a floppy disk unit 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the access control module 104 to implement the present systems and methods may be stored within the system memory 1117. Applications resident with computer system 1110 are generally stored on and accessed via a non-transitory computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 11 need not be present to practice the present systems and methods. The devices and subsystems can be interconnected in different ways from that shown in FIG. 11. The operation of a computer system such as that shown in FIG. 11 is readily known in the art and is not discussed in detail in this application. Code to implement the present disclosure can be stored in a non-transitory computer-readable medium such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for content-aware access control, comprising:
   intercepting, by a processor, access control traffic and data traffic that are being communicated to a content sharing service;
   inspecting, by the processor, the access control traffic to obtain an access control action, the access control action identifying content and one or more users;
   inspecting, by the processor, the data traffic to generate a database of sensitivity classifications;
   determining, by the processor, a first sensitivity classification for the content from the database of sensitivity classifications;
   determining, by the processor, a sensitivity rating for the one or more users;
   determining, by the processor, whether the first sensitivity classification and the sensitivity rating satisfy a policy; and
   upon determining that the policy is not satisfied, enforcing a policy restriction.

2. The method of claim 1, wherein the policy specifies a required sensitivity rating for a given sensitivity classification.

3. The method of claim 2, further comprising:
   matching, by the processor, the first sensitivity classification with the given sensitivity classification.

4. The method of claim 2, further comprising:
   comparing, by the processor, the sensitivity rating with the required sensitivity rating.

5. The method of claim 1, wherein the content sharing service comprises a software as a service cloud provider.

6. The method of claim 1, wherein the policy restriction comprises rejecting the access control action.

7. The method of claim 1, wherein the content comprises at least one of a file or a folder.

8. A computing device configured for content-aware access control, comprising:
   a processor;
   memory in electronic communication with the processor;
   instructions stored in the memory, the instructions being executable by the processor to:
      intercept access control traffic and data traffic that are being communicated to a content sharing service;
      inspect the access control traffic to obtain an access control action, the access control action identifying content and one or more users;
      inspect the data traffic to generate a database of sensitivity classifications;
      determine a first sensitivity classification for the content from the database of sensitivity classifications;
      determine a sensitivity rating for the one or more users;
      determine whether the first sensitivity classification and the sensitivity rating satisfy a policy; and
      upon determining that the policy is not satisfied, enforce a policy restriction.

9. The computing device of claim 8, wherein the policy specifies a required sensitivity rating for a given sensitivity classification.

10. The computing device of claim 9, wherein the instructions are further executable by the processor to:
    matching, by the processor, the first sensitivity classification with the given sensitivity classification.

11. The computing device of claim 9, wherein the instructions are further executable by the processor to:
    comparing, by the processor, the sensitivity rating with the required sensitivity rating.

12. The computing device of claim 8, wherein the content sharing service comprises a software as a service cloud provider.

13. The computing device of claim 8, wherein the policy restriction comprises rejecting the access control action.

14. The computing device of claim 8, wherein the content comprises at least one of a file or a folder.

15. A computer-program product for content-aware access control, the computer-program product comprising a non-transitory computer-readable storage medium that stores computer executable instructions, the instructions being executable by a processor to:
    intercept access control traffic and data traffic that are being communicated to a content sharing service;
    inspect the access control traffic to obtain an access control action, the access control action identifying content and one or more users;
    inspect the data traffic to generate a database of sensitivity classifications;
    determine a first sensitivity classification for the content from the database of sensitivity classifications:
    determine a sensitivity rating for the one or more users;
    determine whether the first sensitivity classification and the sensitivity rating satisfy a policy; and
    upon determining that the policy is not satisfied, enforce a policy restriction.

16. The computer-program product of claim 15, wherein the policy specifies a required sensitivity rating for a given sensitivity classification.

* * * * *